US012812461B2

(12) United States Patent
Rhyu et al.

(10) Patent No.: US 12,812,461 B2
(45) Date of Patent: Nov. 24, 2026

(54) METHOD AND APPARATUS FOR PROVISIONING OF PAYLOAD DATA STRUCTURE INFORMATION FOR EFFICIENT DATA TRANSMISSION IN LOWER LAYER

(71) Applicant: Samsung Electronics Co., Ltd., Suwon-si (KR)

(72) Inventors: Sungryeul Rhyu, Suwon-si (KR); Hyunkoo Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 18/626,794

(22) Filed: Apr. 4, 2024

(65) Prior Publication Data

US 2024/0340696 A1 Oct. 10, 2024

(30) Foreign Application Priority Data

Apr. 6, 2023 (KR) ........................ 10-2023-0045583

(51) Int. Cl.
*H04W 28/06* (2009.01)
*H04L 5/00* (2006.01)

(52) U.S. Cl.
CPC ........... *H04W 28/06* (2013.01); *H04L 5/0044* (2013.01)

(58) Field of Classification Search
CPC ............................. H04W 28/06; H04L 5/0044
See application file for complete search history.

(56) References Cited

U.S. PATENT DOCUMENTS

2005/0036546 A1 2/2005 Rey
2009/0238255 A1* 9/2009 Chau .................... H04B 7/0848 375/227
2014/0064192 A1 3/2014 Ho et al.
2015/0373075 A1 12/2015 Perlman et al.
2019/0073539 A1 3/2019 Yu et al.
2021/0306381 A1* 9/2021 Zhang .................... H04L 63/205
2025/0323983 A1* 10/2025 De Foy ............... H04L 65/1108
2026/0012842 A1* 1/2026 Luo ................... H04W 28/0268
2026/0040298 A1* 2/2026 Rao ....................... H04W 72/11

FOREIGN PATENT DOCUMENTS

KR 10-2018-0131411 A 12/2018
WO 2023023414 A2 2/2023

OTHER PUBLICATIONS

3GPP RAN WG2 Meeting #120, “Discussion on PDU sets and data bursts”, Nov. 14-18, 2022, (R2-2212471) (Year: 2022).*
International Search Report and Written Opinion of the International Searching Authority dated Jul. 16, 2024, in connection with International Application No. PCT/KR2024/004325, 7 pages.

(Continued)

*Primary Examiner* — Siren Wei

(57) ABSTRACT

The disclosure relates to a 5G or 6G communication system for supporting a higher data transmission rate. The disclosure may provide a method and apparatus for providing structure information of payload data so that extended Reality (XR) data can be transmitted effectively at a transport layer when transmitting the XR data as the payload of a packet in a communication system.

16 Claims, 7 Drawing Sheets

(56) References Cited

OTHER PUBLICATIONS

Interdigital Inc., "Discussion on PDU sets and data bursts," R2-2212471, 3GPP RAN WG2 Meeting #120, Toulouse, France, Nov. 14-18, 2022, 4 pages.
Vice Chairman (NOKIA), "Report on XR," R2-22xxxxxx, 3GPP TSG-RAN WG2 Meeting #120 Toulouse, France, Online, Nov. 2022, 24 pages.
Supplementary European Search Report dated Apr. 23, 2026, in connection with European Patent Application No. 24785212.2, 19 pages.
3rd Generation Partnership Project; Technical Specification Group Services and System Aspects; Study on XR (Extended Reality) and media services (Release 18), 3GPP TR 23. 700-60 V18.0.0, Dec. 2022, 266 pages.

* cited by examiner

METHOD AND APPARATUS FOR PROVISIONING OF PAYLOAD DATA STRUCTURE INFORMATION FOR EFFICIENT DATA TRANSMISSION IN LOWER LAYER

CROSS REFERENCE TO RELATED APPLICATION

The present application claims priority under 35 U.S.C. § 119 to Korean Patent Application No. 10-2023-0045583, filed Apr. 6, 2023, the entire contents of which is incorporated herein for all purposes by this reference.

BACKGROUND

1. Field

The disclosure relates to a method and apparatus for providing structure information of payload data so that extended Reality (XR) data can be transmitted effectively at a transport layer when transmitting the XR data as the payload of a packet in a communication system.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mm Wave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mm Wave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The 3GPP uses a protocol stack including various layers to manage data transmission and communication in a radio network. Among the layers, representative layers include an Application layer, a PDU layer, an RRC layer, a MAC layer, and an RLC layer. The Application layer is responsible for an interface between a user application and a radio network, and the PDU layer defines data transmission units and provides protocols for transmitting data in an IP network. The RRC layer manages radio resources in a radio link, the MAC layer performs data medium access control, and the RLC layer performs data transmission control.

The Application layer is the highest layer in the 3GPP protocol stack and serves as an interface between the user application and the radio network. This layer is the layer closest to the user application and provides various protocols to meet the user's data requirements. For example, hyper text transfer protocol (HTTP) is used as a protocol for web services, and session initiation protocol (SIP) is used as a protocol for voice and multimedia services. Real-time transport protocol (RTP) is a protocol for multimedia data transmission and is used with SIP to transmit actual data in a multimedia session. These protocols are transmitted from an upper layer to a lower layer to handle user data.

The protocol data unit (PDU) layer is a data transmission unit used in the 3GPP, which encapsulates data and provides protocols for transmission on Internet Protocol (IP) networks. This layer includes several sublayers, and each sublayer handles data transmission methods and protocols. For example, the radio link control (RLC) sublayer controls data transmission in a radio link, and the media access control (MAC) sublayer performs medium access control for data transmission in a radio link. The PDU layer is used in a radio network (RAN) and provides an interface between the radio network and the core network.

The radio link control (RLC) layer provides a control protocol for reliable data transmission in the radio link between the radio network and the UE. The RLC layer is located between the PDU layer and the MAC layer and performs functions such as data segmentation and assembly, flow control, error control, sequence control, retransmission, and automatic repeat request (ARQ) for data transmission.

The media access control (MAC) layer performs medium access control for data transmission on the radio link. The MAC layer is located between the RLC layer and the PDU layer and serves to control the radio link between the radio network and the UE. This layer performs functions such as access control for sharing a radio channel, scheduling, hardware handling, error control, and retransmission, and determines the transmission priority, transmission periodicity, and transmission format of data in the radio link.

The radio resource control (RRC) layer provides a protocol for managing radio resources in the radio link. This layer performs functions such as radio resource allocation, radio link configuration and release, and radio link status management. The RRC is the lowest layer and is responsible for controlling the radio interface between the user equipment (UE) and an ultra terrestrial radio access network (UTRAN). This layer is responsible for handling transmission requirements between the UE and the radio network and receiving allocation of radio network resources.

The data may be exchanged between these layers in the following manner.

The data generated at the application layer is encapsulated into an IP packet at the PDU layer. The IP packet includes an IP address for routing and protocol information for transmitting data. Then, in order to transmit data on the radio link, the MAC layer converts the IP packet into MAC PDU, which is a format that may be transmitted over the radio link. This case, the MAC PDU may be segmented into smaller units, RLC PDUs, in the RLC layer, which is a lower layer. The RLC PDU is the minimum transmission unit to perform functions such as error control, sequence control, and retransmission in the RLC layer.

The packet name for data exchange between the application layer and the PDU layer is non-access stratum (NAS) protocol data unit (PDU). This refers to a data packet transmitted over a radio network.

The data exchange between a packet data convergence protocol (PDCP) and the RLC is performed through segmentation and reassembly of transmitted packet data. The data exchange between the RLC and the MAC varies depending on the platform, but is typically performed through shared memory or queues. The data exchange between the MAC and the RRC is performed over a radio interface.

Depending on the transmission scheme handled by the transport layer, transmission errors in transmission units and resulting drops may occur. Among these, a PDU unit drop in the PDU layer may occur based on various reasons. For example, there may be cases where PDU data is lost due to noise or radio signal interference on the radio link. Alternatively, PDU transmission may be delayed or interrupted due to insufficient bandwidth of the radio link or network congestion.

These PDU drops may result in loss of user data. In particular, user data at the application layer is segmented into IP packet, MAC PDU, RLC PDU, etc. during transmission through several layers, and is then reassembled to restore the original user data. Therefore, when a drop occurs at the PDU layer, some of these data fragments may be lost, ultimately resulting in loss of part or all of the user data.

The 3GPP provides various methods to solve these problems. For example, the RLC layer uses an automatic repeat request (ARQ) technology to retransmit data lost during PDU transmission, thereby ensuring lossless data transmission. In case where PDU data is lost due to noise on the radio link, a hybrid automatic repeat request (HARQ) technology may be used to quickly detect the loss of the PDU data and attempt retransmission to ensure lossless data transmission.

The rate of loss that occurs during data transmission in the PDU layer may be referred to as a packet error rate (PER). The PER is usually expressed in the unit of percentage and represents the ratio of PDUs that have not been received correctly at a reception end among the transmitted PDUs. The PER depends on various factors such as radio link status, bandwidth, and data transmission amount, and these factors may work together to cause PDU drop.

The 3GPP provides various error control and retransmission technologies to minimize the PER. For example, the RLC layer may use the ARQ technology to reduce the PER by retransmitting data lost during PDU transmission. In addition, in case where the PDU data is lost due to noise on the radio link, by using the HARQ technology, such PDU data loss may be quickly detected and retransmission may be attended to minimize the PER. However, in a general radio environment, it may be difficult to ensure stable data transmission with perfect PER, and therefore, in the 3GPP, as part of efforts to minimize the data loss rate in the radio network, operations at the transport layer, which are performed based on understanding of user data, is being considered.

When transmitting video data generated at the application layer, the entire video data may be encapsulated into numerous RTP packets. In recent discussions, one RTP packet is associated with one PDU packet, a bundle of PDUs corresponding to a video data frame or a slice constituting a frame is called a PDU set, and when dropping PDU in an unavoidable situation, it is being considered to perform PDU drop in units of PDU sets. However, in case of receiving RTP packets or PDU packets, which are fragments of user data, and dropping the PDU sets, which are a bundle of the RTP packets or PDU packets, without understanding the entire user data, there is a problem in which user data cannot be reproduced on the reception end, or even when reproduced, serious errors occur in the content.

Accordingly, a method in which the PDU layer may determine and handle the drop on a PDU set unit without understanding the entire user data is needed.

SUMMARY

An object of the disclosure is to perform efficient transmission scheduling of user data in a lower transport layer without understanding the structure of user data, which is data of an upper application layer.

According to an embodiment of the present disclosure, there is provided a method performed by a transport layer of a first network entity in a wireless communication system, comprising receiving, from an application layer of the first network entity, real time transport protocol (RTP) packets associated with video data and information on importance associated with each packet data unit (PDU) set of PDU sets; generating the PDU sets based on the received RTP packets; determining which PDU sets to transmit among the generated PDU sets based on the information on importance; and transmitting, to a second network entity, the determined PDU sets.

In an embodiment, the information on importance of a PDU set is associated with a number of affected frames that precedes or follows the PDU set.

In an embodiment, the information on importance of a PDU set is associated with a size of affected data that precedes or follows the PDU set.

In an embodiment, the information on importance indicates an error propagation size.

In an embodiment, determining which PDU sets to transmit is performed in case that PDU data is lost or a PDU transmission is delayed or interrupted.

According to an embodiment of the present disclosure, there is provided a method performed by an application layer of a first network entity in a wireless communication system, comprising receiving, from a third network entity, video data; segmenting the video data into a plurality of semantic units, wherein the plurality of semantic units includes at least one of an I-frame, a B-frame, or a P-frame; generating information on importance associated with each packet data unit (PDU) set of PDU sets based on a relation between the plurality of semantic units; and transmitting, to a transport layer of the first network entity, real time transport protocol (RTP) packets associated with the video data and the information on importance.

According to embodiments of the disclosure, the user data structure is segmented into detailed semantic units and a characteristic value is assigned to each unit, and transmission for individual transmission units is performed accordingly, or resource allocation for transmission or transmission drop may be determined.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
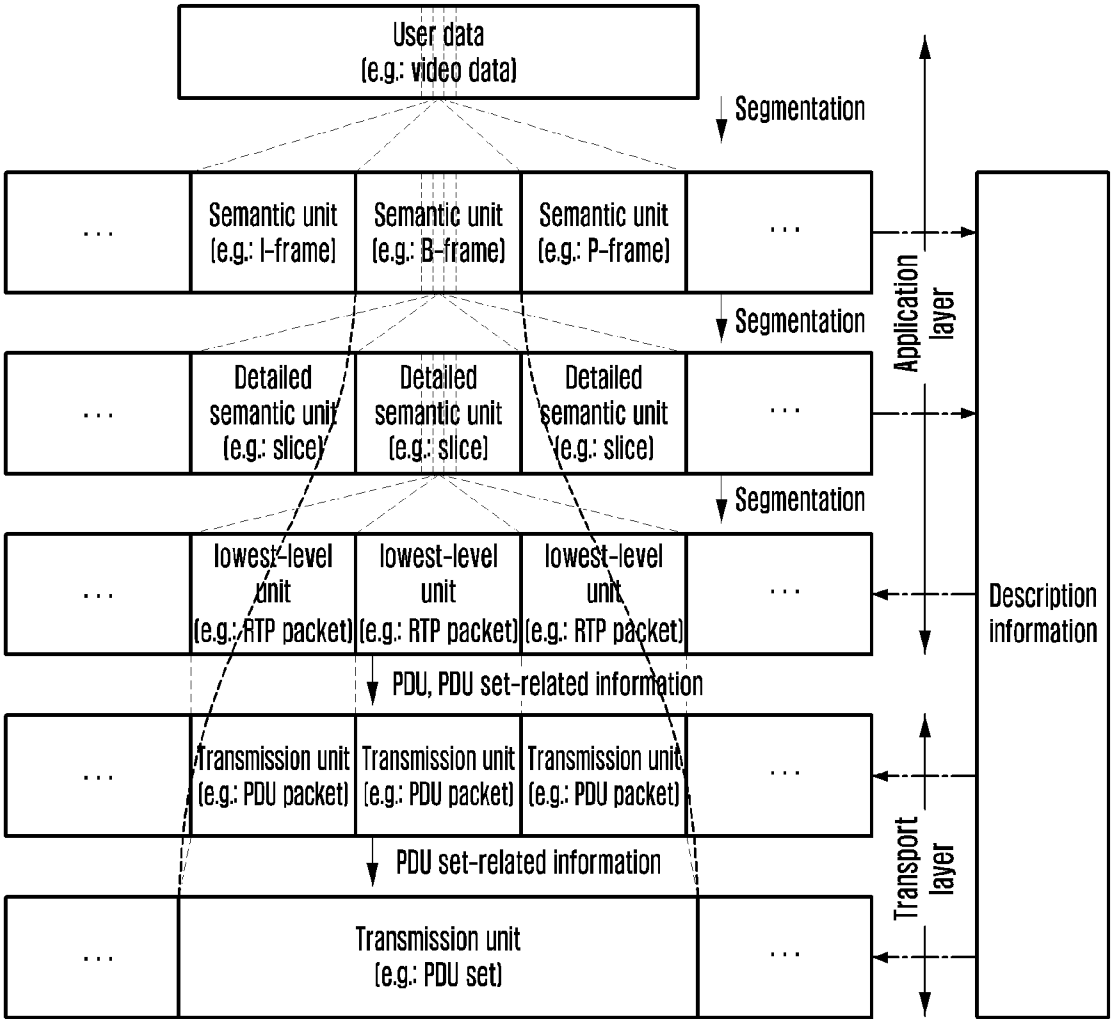
FIG. 1 illustrates a diagram of a data unit in a process of transmitting user data to a lower transport layer according to an embodiment of the disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In this specification, in describing the embodiments, a description of technology contents that are well known in the art to which the disclosure pertains and that are not directly related to the disclosure is omitted in order to clearly deliver the gist of the disclosure without obscuring the gist of the disclosure by omitting an unnecessary description.

For the same reason, in the accompanying drawings, some elements may be exaggerated, omitted, or schematically illustrated. Further, the size of each element does not completely reflect the actual size. In each drawing, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create means for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction means for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" used in the disclosure means a software component or hardware component such as FPGA or ASIC, and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be further divided into additional components and "units". Furthermore, the components and "units" may be implemented to reproduce one or more CPUs in a device or security multimedia card.

The disclosure provides a method for enabling more efficient transmission scheduling (e.g., burst transmission, drop) for user data in a lower transport layer (e.g., PDU layer) without understanding the structure of user data (e.g., video), which is data of an upper application layer (e.g., Application layer). In the method, the user data is first segmented into 'semantic units' according to structure and role, and the segmented semantic unit data is further segmented into 'detailed semantic units', which are further segmented into 'lowest-level units', and thus, data fragments corresponding to the lowest-level units of the application layer constitute a unit transmitted to a transport layer. Next, each lowest-level unit include information about a characteristic value that an upper 'detailed semantic unit' including a corresponding lowest-level unit has when compared to other 'detailed semantic units', and a characteristic value that an upper 'semantic unit' including a corresponding lowest-level unit has when compared to other 'semantic units'. Next, the transport layer determines and executes implementation of transmission for individual transmission units, allocation of resources for transmission, or drop of transmission according to the characteristic values of the lowest-level unit received from the application layer.

FIG. 1 illustrates a diagram of a data unit in a process of transmitting user data to a lower transport layer according to an embodiment of the disclosure.

With reference to FIG. 1, for example, if the semantic unit to which one lowest-level unit belongs is an I-frame of a video, the corresponding lowest-level unit may include description information called 'referenced by another frame', which is a characteristic value derived from the relationship with the B-frame, which is another semantic unit (i.e. frame) that is equivalent to the semantic unit to which it belongs, the I-frame. If the semantic unit to which another lowest-level unit belongs is the B-frame of a video, the lowest-level unit may include description information called 'referring to another frame', which is a characteristic value derived from the relationship with the I-frame, which is another semantic unit that is equivalent to the semantic unit, the B-frame.

The disclosure proposes description information that may be given to each lowest-level unit in the application layer, and explains the meaning and derivation method of the description information and the operation in the transport layer according to reception of the corresponding description information.

Figure 2:
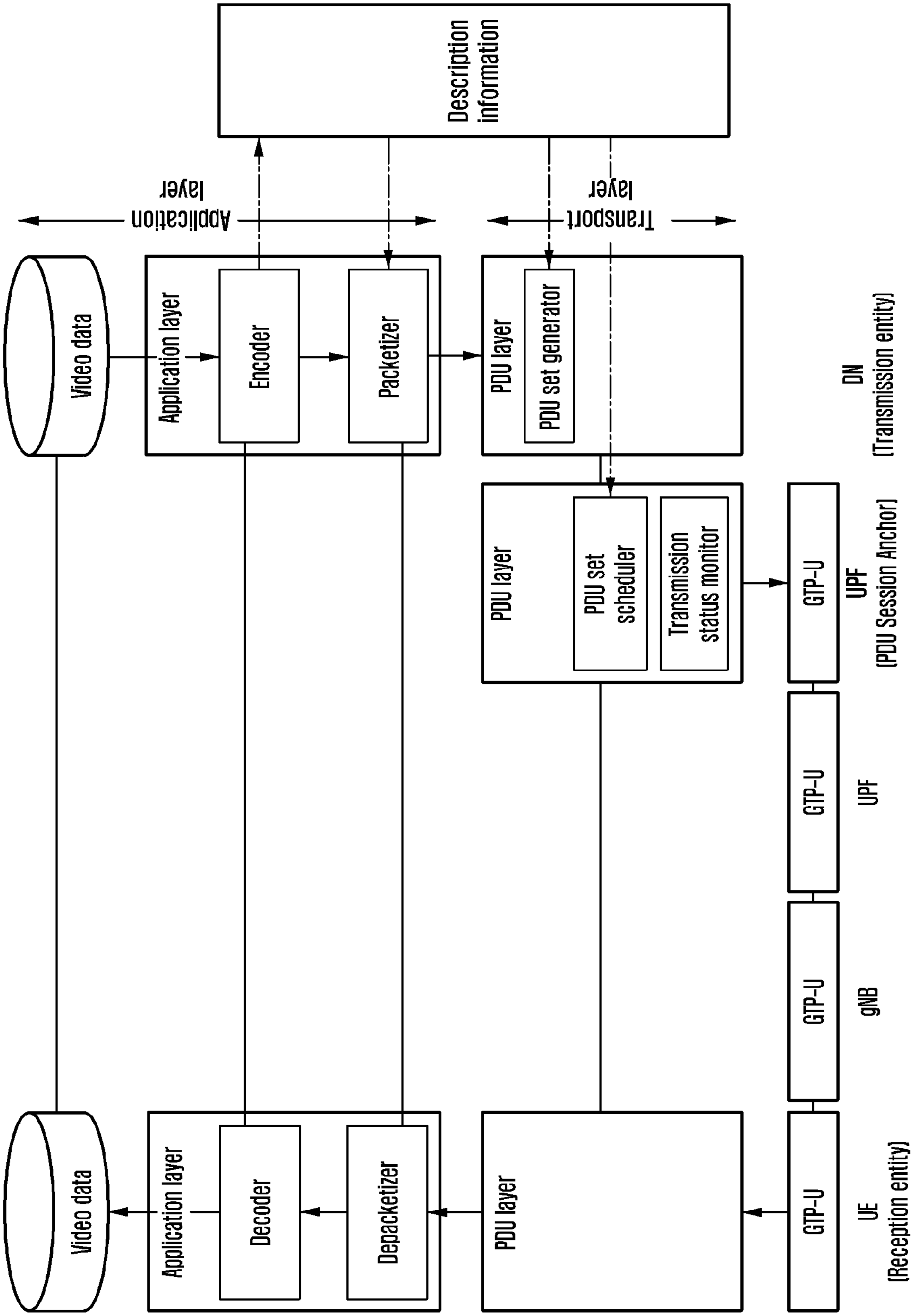
FIG. 2 illustrates a diagram of an example of a structure of a transport system according to an embodiment of the disclosure.

FIG. 2 illustrates a diagram of an example of a structure of a transport system according to an embodiment of the disclosure. In the drawing, general packet radio system (GPRS) tunnelling protocol user plane (GTP-U), user entity (UE), 3GPP 5G next generation base station which supports the 5G New Radio (gNB), user plane function (UPF), PDU session anchor (PDU session start point), data network (DN), etc. mean conventional function blocks defined and used in the 5G system of 3GPP, a mobile communication system, so basic operations, not the operation that the disclosure is to add, are based on the standard.

In order to transmit the video data acquired from a transmission entity to a reception entity, the video data is encoded, encapsulated or packetized at the application layer, and converted into a protocol data unit (PDU) at the transport layer, and is created as a PDU set, which is a set of PDUs. Then, the PDU set is encapsulated and transmitted as GTP-U, which is a radio transmission protocol packet of a mobile communication system, and is received by the reception entity.

In the transport system according to the disclosure, when handling video data, which is user data, in the application layer, the encoder achieves compression efficiency based on the interrelationship of frames, which are semantic units, and generates the above-mentioned interrelationship as description information. The packager or encapsulant of the application layer decomposes the semantic unit or detailed semantic unit into the lowest-level unit and includes the same in a packet to be transmitted to the transport layer, and in this case, transmits the above-described description information through a packet header or a separate signaling message. The description information transmitted to the transport layer through the header of the transport packet or a separate signaling message serves as the description information of the PDU set through the PDU. When the semantic units of the PDU set of the transport layer and the user data of the application layer form a 1:1 mapping relationship, the scheduling of the PDU set based on the description information has the same effect as the transport layer performing the transmitting of the user data of the application layer in semantic units.

The transport layer session for transmitting the user data is initialized in the PSA. The PSA receives the PDU set created by the DN and performs transmission scheduling based on the description information. When available resources reach their limit due to various reasons such as data network resources for transmission, radio network resources, and data priority, the transport layer determines whether to transmit the data currently to be transmitted. The determination of whether to transmit is performed in units of PDU sets, and the description information describing the PDU set explains the importance of the current PDU set as the relationship between previously transmitted PDU sets and PDU sets to be transmitted in the future. The PDU layer of the PSA monitors various variables regarding recent successful or failed transmission situations, and, based on this information, determines whether the current data should be transmitted or dropped depending on whether the impact of the drop is at a manageable level.

[Embodiment 1] PDU Set Forward/Backward Dependency

An embodiment of the disclosure includes current PDU set dependency information of a previous/next PDU set as the above description information.

From the application layer's perspective, current data may be related to data that has already been transmitted or will be transmitted later. For example, one lowest-level unit may include data essential for decoding other semantic unit data that has been previously transmitted or will be transmitted later. Since such relationship information in the application layer is not identified in the transport layer, in the disclosure, as an example, a method in which the reference relationship information before and after between semantic units or detailed semantic units is generalized and provided as description information, and the description information is written as additional information of the lowest-unit data to be transmitted to the transport layer is proposed.

A bPrevHasDep field indicates whether previously transmitted data depends on current data. If a corresponding value is 1, it indicates dependency, and if the corresponding value is 0, it indicates non-dependency. In case where the value of the field is 1 and no error has occurred in the previous data transmission, sending the current data is appropriate from the perspective of user data reproduction. This is because if the current data is not transmitted, problems may occur in decoding normally transmitted data. Therefore, the transport layer determines to transmit data with a field value of 1 unless it is unavoidable. However, in case where an error occurs in the previous data transmission, that is, in case where the value of the field is 1 and an error or drop occurs in the previously transmitted data within the reference range of sizePrevHasDep, dropping the current data may be determined to make no significant difference in terms of user data reproduction in the application layer.

The sizePrevHasDep field indicates a range in which data dependent on the current data exists when the value of bPrevHasDep is 1. If the bPrevHasDep value is 1 MB, it indicates that data dependent on the current data exists within the 1 MB of data transmitted just before the current data.

If bPrevHasDep is 1 and sizePrevHasDep is given, the transport layer determines whether there has been a transmission error within the size specified by sizePrevHasDep during the recent data transmission record. The transport layer according to the disclosure may manage sizeSuccessful, which is the size of normally transmitted data from the most recent transmission error to immediately before, and percSuccessful, which is the size of error data to the size of normally transmitted data.

If the sizeSuccessful value is greater than the sizePrevHasDep value, since no error occurred in the previous data transmission process referencing the current data, it may be determined to transmit as much of the current data as possible to ensure that the successfully transmitted data is properly decrypted.

If the sizeSuccessful value is smaller than the sizePrevHasDep value, since an error has occurred during the transmission of previous data referencing the current data, it may be determined that data with an error has been reproduced to the user before the current data. In addition, a degree of error may be determined depending on the level of percSuccessful. Accordingly, whether to handle the current data as an error may be determined by referring to the above information.

The bNextHasDep field indicates whether data to be transmitted later depends on the current data. A value of 1 indicates dependency, and a value of 0 indicates non-dependency. If the value of the field is 1, it means that a problem may occur with user data even if succeeding data is transmitted normally after error handling of the current data. Therefore, the transport layer determines to transmit data with a field value of 1 unless it is unavoidable. If the value of the field is 0, it means that even if the current data is handled as an error, there will be no problem with the user data if succeeding data is transmitted normally. Therefore, the transport layer may determine on error handling for data with a field value of 0 if necessary.

The sizeNextHasDep field indicates a range in which data dependent on the current data exists if the value of the bNextHasDep field is 1. If the bNextHasDep value is 1 MB, it indicates that data dependent on the current data exists within 1 MB of data to be transmitted immediately after the current data.

If bNextHasDep is 1, the transport layer may expect that data that depends on the current data will arrive among future data to be transmitted within the size of sizeNextHasDep. The transport layer according to the disclosure manages sizeExpected, which is the size expected for normal transmission.

If the bNextHasDep value is 1 and the sizeNextHasDep size is given, the transport layer configures the value of sizeExpected, which indicates the size for which normal transmission has been requested after successful transmission of the current data (e.g., the nth transmitted PDU set), to sizeNextHasDep, and manages the value of sizeNextHasDep until it eventually becomes 0 by reducing the value of sizeNextHasDep by the size of the transmitted data for each transmission of succeeding data (e.g., n+1-th and n+2-th PDU sets). If the value of sizeExpected becomes 0, it is determined that all succeeding data with reference to the data with bNextHasDep (the nth PDU set described above) has been transmitted.

If it is determined that a drop is inevitably necessary before the value of sizeExpected becomes 0, the transport layer performs a drop, configures the value of sizeExpected to 0, and does not manage the sizeExpected value until the PDU set with the next bNextHasDep flag appears.

Various aspects of the aforementioned fields are described in Tables 1-4 below.

TABLE 1

| bPrevHasDep | Description |
|---|---|
| Meaning of fields | Whether previously transmitted data depends on current data. A value of 1 indicates dependency, and a value of 0 indicates non-dependency. (Additional mention of semantic units and detailed semantic units) |
| Type of fields | boolean |
| Operations of layer | In case where the value of the field is 1 and no previous transmission error has occurred, sending the current data is appropriate from the perspective of user data reproduction. Therefore, the transport layer determines to transmit data with a field value of 1 unless it is unavoidable.<br>In case where the value of the field is 1 and an error or drop has occurred in previously transmitted data within a reference range, sizePrevHasDep, it may be determined that sending the current data will not be of great help in terms of upper data reproduction. |

TABLE 2

| sizePrevHasDep | Description |
|---|---|
| Meaning of fields | If bPrevHasDep is 1, it indicates a range in which data dependent on the current data exists. If the bPrevHasDep value is 1 MB, it indicates that data dependent on the current data exists within the 1 MB of data transmitted just before the current data. |
| Type of fields | integer (the number of bytes) |
| Operations | The transport layer determines whether bPrevHasDep is 1 and whether there has been a transmission error within the sizePrevHasDep size. The transport layer according to the disclosure manages sizeSuccessful, which is the size of normally transmitted data from the most recent transmission error to immediately before, and percSuccessful, which is the size of error data to the size of normally transmitted data.<br>If sizeSuccessful is greater than sizePrevHasDep, since no error has occurred during the transmission of previous data referencing the current data, it may be determined to transmit as much of the current data as possible to ensure that the successfully transmitted data is properly decrypted.<br>If sizeSuccessful is smaller than sizePrevHasDep, an error has occurred during the transmission of previous data referencing the current data, so it may be determined that data with an error being played to the user before the current data. In addition, a degree of error may be determined depending on the level of percSuccessful. Accordingly, the above information may be referred to when determining whether to handle the current data as an error. |

TABLE 3

| bNextHasDep | Description |
|---|---|
| Meaning of fields | Whether data to be transmitted later depends on the current data. A value of 1 indicates dependency, and a value of 0 indicates non-dependency. |

TABLE 3-continued

| bNextHasDep | Description |
| --- | --- |
| Type of fields | boolean |
| Operations | If the value of the field is 1, it means that a problem may occur with user data even if succeeding data is transmitted normally after error handling of the current data. Therefore, the transport layer determines to transmit data with a field value of 1 unless it is unavoidable.<br>If the value of the field is 0, it means that even if the current data is handled as an error, there will be no problem with the user data if succeeding data is transmitted normally. Therefore, the transport layer may determine error handling for data with a field value of 0, if necessary. |

TABLE 4

| sizeNextHasDep | Description |
| --- | --- |
| Meaning of fields | If bNextHasDep is 1, it indicates a range in which data dependent on the current data exists. If the bNextHasDep value is 1 MB, it indicates that data dependent on the current data exists within 1 MB of data to be transmitted immediately after the current data. |
| Type of fields | integer (the number of bytes) |
| Operations | If bNextHasDep is 1, the transport layer may expect that data depending on the current data will arrive among future data to be transmitted within the size of sizeNextHasDep. The transport layer according to the disclosure manages sizeExpected, which is the size expected for normal transmission.<br>If bNextHasDep is 1 and a sizeNextHasDep size is given, the transport layer configures the value of sizeExpected to sizeNextHasDep after successful transmission of the current data (e.g. the nth transmitted PDU set), and manages the value of sizeNextHasDep until it eventually becomes 0 by reducing the value of sizeNextHasDep by the size of the transmitted data for each transmission of succeeding data (e.g., n + 1-th and n + 2-th PDU sets). If the value of sizeExpected becomes 0, it is determined that all data with reference to the data with bNextHasDep (the nth PDU set described above) has been transmitted.<br>If it is determined that a drop is necessary before the value of sizeExpected becomes 0, the transport layer performs a drop, configures the value of sizeExpected to 0, and does not manage the sizeExpected value until the PDU set with the next bNextHasDep flag appears. |

Figure 3:
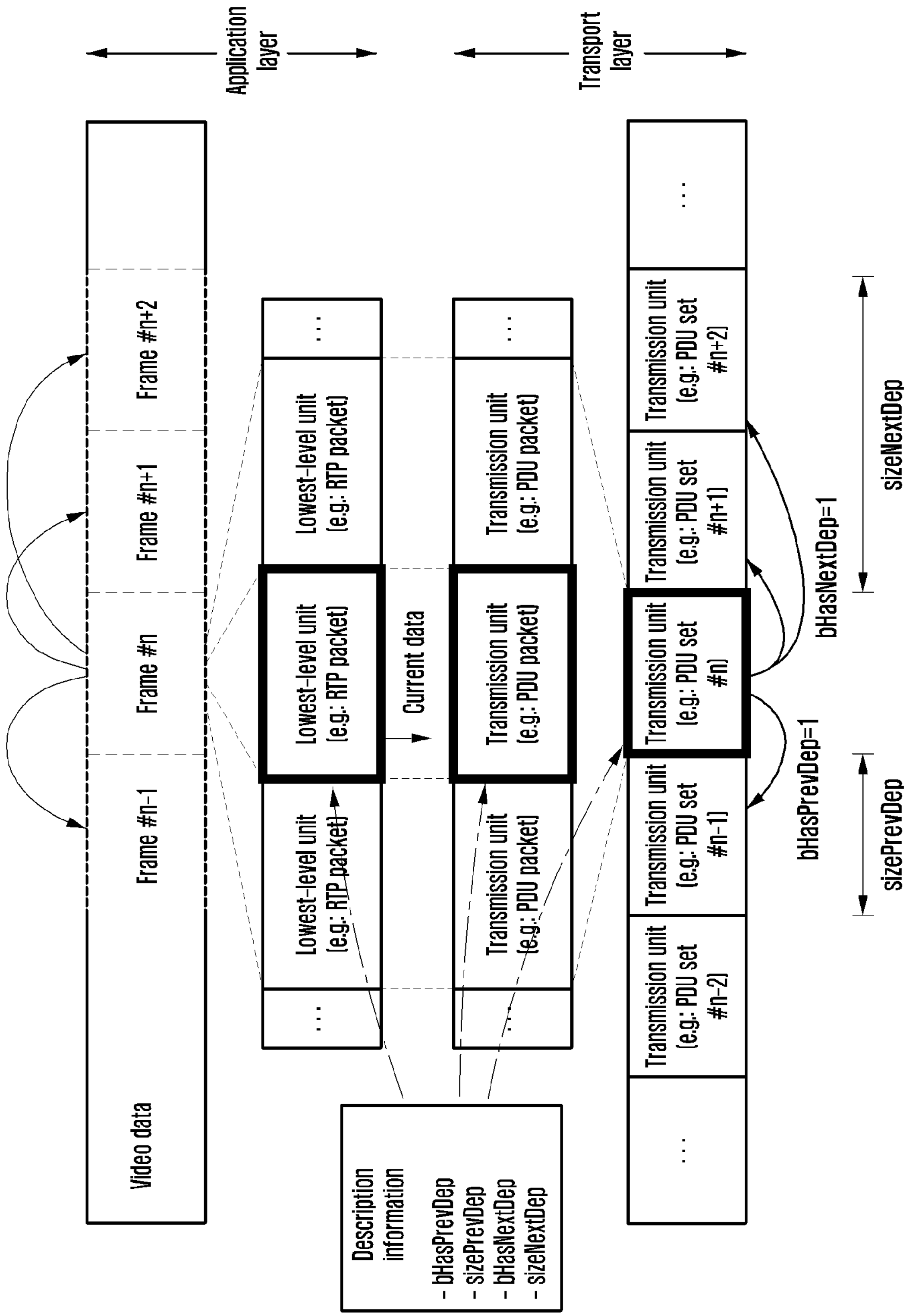
FIG. 3 illustrates a diagram of a process in which an association relationship between video frames generated in an application layer is written in an RTP packet, written in a PDU packet, and written in a PDU set, as description information, and then transmitted to a transport layer according to an embodiment of the disclosure.

FIG. 3 illustrates a diagram of a process in which an association relationship between video frames generated in an application layer is written in an RTP packet, written in a PDU packet, and written in a PDU set, as description information, and then transmitted to a transport layer according to an embodiment of the disclosure.

The video frames in the application layer may be coded based on the interrelationship during the video coding process for compression. A coding structure is a structural relationship designed to suit the usage method of an application program, etc., and the embodiment of the disclosure is explained by referring an example of a hypothetical coding structure. This coding structure indicates the type of frame, such as I, B, B, B, P, B, B, B, from a first frame, and depending on the type of frames, the frame may be coded by recording information about a piece of an image that may be predicted from the previous and succeeding frames to the frame itself. A second frame dependent on the first frame means a frame that requires the contents of the first frame in decoding the second frame. Therefore, the n−1th frame in the drawing depends on the nth frame, and similarly, the n+1th and n+2th frames also depend on the nth frame.

Since in the nth frame, the n−1th frame before the nth frame depends on itself, the value of the bHasPrevDep field of the disclosure is written as 1, that is, true. The sum of the data sizes of the referenced frames becomes sizePrevDep, and when written in the header of a PDU packet, this value is written as the sum of the sizes of all corresponding PDU packets. When written in the header of a PDU set, this value is written as the sum of the sizes of all corresponding PDU packets.

In the nth frame, since the n+1 and n+2th frames after the nth frame depend on themselves, the value of the bHasNextDep field of the disclosure is written as 1, that is, true. The sum of the data sizes of the referenced frames becomes sizeNextDep, and when written in the header of a PDU packet, this value is written as the sum of the sizes of all corresponding PDU packets, and when written in the header of a PDU set, this value is written as the sum of the sizes of all corresponding PDU packets.

Since a plurality of RTP packets created in one frame are each mapped to a PDU packet, it may be inefficient to repeat information about the frame in the plurality of RTP packets and PDU packets. When an RTP packet describes information about a frame, the corresponding information may be written redundantly in all RTP packets transmitted consecutively, or alternatively, it may not be written redundantly. When the PDU packet receives information corresponding to a frame among the contents described in the RTP packet, the PDU packet transmits the frame information of the RTP packet, which describes the frame information, among several RTP packets corresponding to the same frame number, to the PDU set as frame information of the PDU set. If the frame information written for the same frame is written differently in a succeeding RTP packet, the frame information is updated based on the difference between the initial value predicted during the encoding process and the actual value written after actual execution.

When transmitting the PDU, the transport layer uses the PDU set as the unit of error handling. That is, when performing drop as a method to resolve the lack of transmission resources, the drop may be performed in units of PDU sets rather than dropping on individual PDUs. Accordingly, the dependency relationship between frames in the application layer becomes the same as the relationship between the PDU sets in the transport layer. The transport layer does not know about the data of the application layer, and therefore cannot know information about whether it is video data, text data, or whether it is an I frame or a B frame. Therefore, the inter-frame relationship information written in the RTP packet from the application layer and transmitted to the transport layer is used as a basis for the transport layer to identify the relationship between the PDU sets and perform the resulting handling (e.g., drop).

Figure 4:
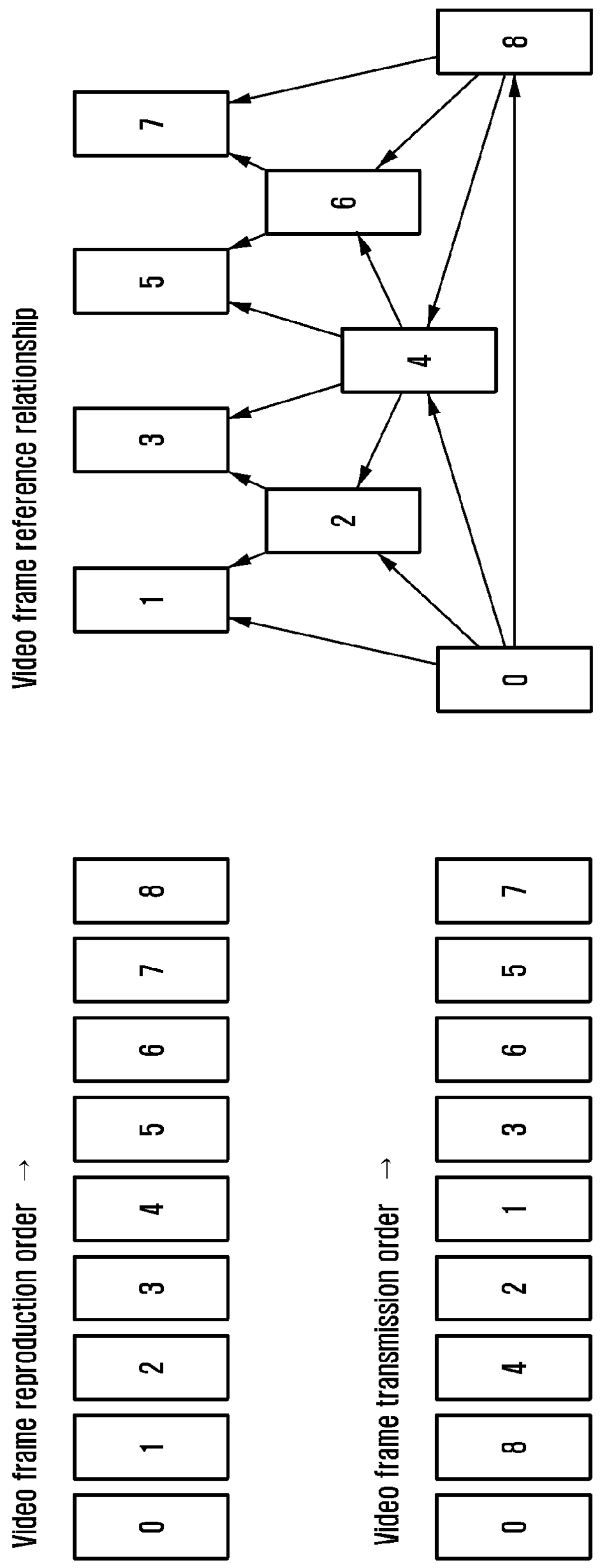
FIG. 4 illustrates a diagram of a video frame order and reference relationship according to an embodiment of the disclosure.

FIG. 4 illustrates a diagram of a video frame order and reference relationship according to an embodiment of the disclosure.

With reference to FIG. 4, depending on the type of video coding and usage example of the application, the frames may be transmitted in order or may be transmitted with priority over the referenced frames. For example, in the above-described example, the frames are acquired and reproduced in the order from 0 to 9, but they may be transmitted in the order in which the frames are decoded, such as the order of 0, 8, 4, 2, 1, 3, 6, 5, 7. In case where information other than the reference relationship, such as information such as reproducing order, is transmitted to the transport layer, the complexity of memory management required for processing in the transport layer increases, so the values of the bHasPrevDep, bHasNextDep, sizePrevDep, and sizeNextDep fields described above are written in the order of transmission, not the order of frames.

[Embodiment 2] Error Propagation Size

A drop of current data may affect decoding of not only the current data but also succeeding data. This is called error propagation. The larger the data affected, the greater the need for transmission of current data. The size of the affected data may be expressed in various measurement units (number of frames, reproduction time, data size, etc.) that are affected from the user data perspective of the application layer.

In an embodiment, the size of error propagation may be expressed as a number of succeeding frames affected. When the unit of drop in the transport layer corresponds to a frame in the transport layer, the video decoded from all or part of the frame may differ from the video decoded from the previously transmitted data due to the drop of one frame. The definition of "affected frame", such as frames that are not the same even in the slightest, frames that are outside an allowable error range, and frames that are determined to be problematic for human perception, varies depending on the standard of measurement. The measurement unit and measurement standard for the error propagation are negotiated in advance between the application layer and the transport layer, and between the transmission application layer and the reception application layer, and are written and communicated according to the negotiated results.

In another embodiment, the size of error propagation may be expressed in terms of the size of affected succeeding data. Since the transport layer considers the byte unit size of the data to be transmitted as a range of packet delay budget for data transmission, the size of error propagation written in byte units is an appropriate basis for determination of the size of the impart from the transport layer perspective. When the size is expressed in byte units, the size range may be written in units of affected frames or slices, and a degree of affects is as described above, such as frames that are not the same even in the slightest, frames that are outside an allowable error range, and frames that are determined to be problematic for human perception, frames that are not the same even slightly, frames that are outside the range of allowable error, and the definition of "affected frame" varies depending on the measurement standard. The measurement unit and measurement standard for the error propagation are negotiated in advance between the application layer and the transport layer, and between the transmission application layer and the reception application layer, and are written and communicated according to the negotiated results.

In another embodiment, the size of error propagation may be expressed in terms of the reproduction time of the affected succeeding frame. In recognizing temporary resource shortages and radio wave collisions at the transport layer and determining transmission resource allocation for the current data accordingly, the length of error time perceived by the user due to the drop of the current data is an appropriate basis for determination from the transport layer perspective. When the size is expressed in time units, the size range may be expressed as the total reproduction time of the affected frames, and the time unit is appropriately ms (millisecond) truncated to the decimal point, but may also be adjusted through negotiation. The measurement unit and measurement standard for the error propagation are negotiated in advance between the application layer and the transport layer, and between the transmission application layer and the reception application layer, and are written and communicated according to the negotiated results.

In another embodiment, the size of error propagation may be expressed by comparing it to an average number of error frames. When arbitrary transmission data is dropped, the number of affected frames may be calculated in the process of selecting the user data coding structure of the application layer, and this value is transmitted to the transport layer. The transport layer understands the impact of current data on succeeding data as an average value and determines processing accordingly.

In another embodiment, in addition to the average number of error frames, the number of error frames due to drops in current data is given. If the number of frames affected by a drop in current data is greater than the average number of error frames, the transport layer understands that the impact of the current data on succeeding data is relatively large and determines processing accordingly. The average number of error frames and the number of error frames due to drops in current data may be given as respective information values or in the form of percentages compared to the average. In other words, 133% may be expressed as 33% more frames than the average being affected by the drop in current data.

In another embodiment, various types of values of succeeding data that are affected by a drop in current data may be aggregated and expressed as importance. As the range of affected values increases, the current data may be determined to have higher importance, and as the range of affected succeeding data gets smaller, the current data may be determined to have lower importance. The disclosure displays the importance of current data based on the range of affected data, and evaluates the range of succeeding data relatively. In other words, if the succeeding data affected by a drop in the first data is 5 frames, and the succeeding data affected by a drop in the second data is 10 frames, the importance of the first data may be evaluated and displayed lower than that of the second data. On the other hand, if the succeeding data affected by the drop of the second data is one frame, the importance of the first data may be evaluated and displayed higher than that of the second data. The user data generator or transport packet generator of the application layer determines a range of succeeding data affected in the application layer expression unit (e.g., a frame) or transmission unit (e.g., an RTP packet) of data through the evaluation based on policies before creation of the first data, coding structures, or measurements after creation of the first data, etc., as described above, and compares and indicates the ranges as a relative value, and transmits the indicated value.

In another embodiment, the importance may be expressed as an absolute value. For example, in communication standards, a series of profiles that a transmitter, receiver, or server may understand are determined, and the profiles are classified as having high importance in linear or non-linear proportion to the number of frames affected by data drop, and written in the application layer data or transport layer data. The profile and measurement standard of these important expressions are negotiated in advance between the application layer and the transport layer, and between the transmission application layer and the reception application layer, and are written and communicated according to the negotiated results. The importance is expressed using one or more bits, and in an embodiment, 3 bits are allocated to importance to express an appropriate range. The importance value expresses the number of frames affected by data drop as an exponent of 2. If the importance value is 0, it is 2 to the power of 0, that is, 1, and indicates that the number of frames affected is only the frame itself. Likewise, if the importance value is from 1 to 6, the number of frames ranges from 2, which is 2 to the power of 1, to 64, which is 2 to the power of 6. For example, if 7 frames are affected, it is greater than 4, which is 2 to the power of 2, and less than 8, which is 2 to the power of 3, so it is expressed as 2. If the importance value is 7, it means that the number of frames is equal to or greater than 128, which is 2 to the power of 7.

Through this, the transport layer according to the disclosure reads the error propagation information and/or importance field value written in the transport layer data to understand the scope and size of the impact that each individual data unit has on succeeding data units, and determine and execute transmission resource allocation, drop, scheduling, etc. for the corresponding data accordingly.

Changes to the 3GPP standard specification according to the disclosure are as follows in Table 5:

TABLE 5

| |
|---|
| The application layer provisions an exchange of user data between sending and receiving entities over 3GPP core network which is in charge of transport of data from application layer. The application layer may notify some metadata on certain portion of user data for efficient and better resource management from the transport layers. The transport layer may schedule such as drop, retransmit, or add forward error correction to the user data, upon its own policy or by interpreting the metadata from the application layer. |
| The importance field may be provided explicitly or as a form of descriptions of the portion of user data. |
| propagation_error_size is an example of the description that shows an impact to user data in case there is dropping of the portion of user data. For example, a video stream has many frames that reference each other. Even though one frame is transmitted correctly, decoded picture from the frame can be corrupted if the other frames that it references are corrupted or dropped in transmission. The size of impact by dropping a frame, called the propagation error size, may differ by the coding structure the application has selected, and the position of the frame in the coding structure. Therefore, the propagation error size of a frame may indicate can be interpreted as importance of a frame. In addition, the application layer may provide importance information that is derived from the propagation error size. The larger the propagation error size, the higher importance can be given to each frame. In case the lower number means higher importance, the maximum number means that there is no other frame whose quality is affected by dropping of this frame. |
| Forward or backward dependency is an example of the description that shows a need of the portion of user data. For example, a video stream has many frames that reference each other. Even though one frame is transmitted correctly, decoded picture from the frame can be corrupted if the other frames that it references are corrupted or dropped in transmission. A frame with the forward_dependency as 1 shows that the succeeding user frames reference this frame. backward_dependency as 1 shows that the already trasnmitted user frames reference this frame. Depends on the occurance of error in certain data or time range, the transport layer may decide transmission of the frame. For example, in case there was no error in a pre-defined time range, dropping this frame with backward dependency as 1 may cause corruption of user data that is correctly transmitted. |
| Importance: The size of error propagation in terms of the number of frames or byte size of the frames that are affected by the dropping of this PDU set needs to be considered in the value of the importance. The information on the size of error propagation presented in terms of proportional index. A normative rule to convert the error propagation size into the importance value may be defined differently for each codec. 3 bits are allocated for the importance. The propagation size is mapped on importance field value as exponent of 2, where 0 means 1 PDU set (self) is affected. From 1 to 6 is from 2 to 64 frames. 7 means 128 or more frames. The UPF may not need to understand how the application sets the fled. But UPF may understand the impact and the size of the artifact caused by its dropping operation. |

[Embodiment 3] IPB Ratio Information

Figure 5:
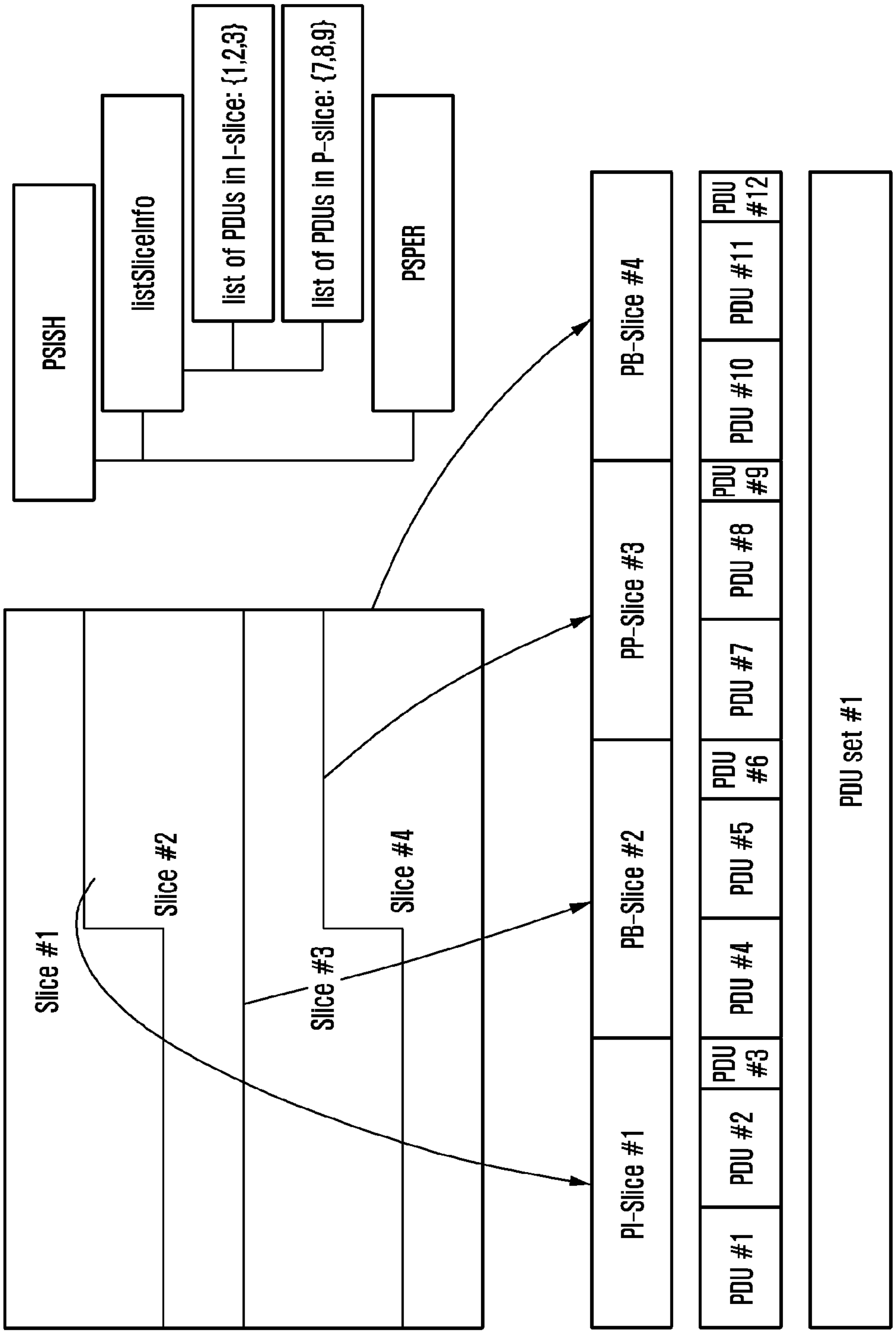
FIG. 5 illustrates a diagram of a scheme in which a PDU set is constituted according to an embodiment of the disclosure.

FIG. 5 illustrates a diagram of a scheme in which a PDU set is constituted according to an embodiment of the disclosure.

An example of the lowest-level unit transmitted from the application layer to the transport layer in the system according to the disclosure is an RTP packet. The transport layer constitutes the data fragments received from the application layer into the PDU packet again, and constitutes several PDU packets into a PDU set, which is a bundle of PDU packets. In a transmission scenario that is the background of the disclosure, as an example of the user data of the application layer, if one frame of video and a PDU set of the transport layer are mapped one-to-one, the PDUs of one PDU set are responsible for transmitting some of the data that constitutes one frame.

When the application layer of the system according to the disclosure segments video data into data units such as RTP packets and transmits the segmented video data, since the average size of RTP is only 1400 bytes, video frame data is transmitted through multiple RTP packets. In this case, if the video frame includes multiple slices, each slice is mapped to an integer number of RTP packets. That is, for example, if one slice has a size of 2000 bytes, 1400 bytes of the 2000 bytes are transmitted using the first RTP packet, and only the remaining 600 bytes are transmitted using the second RTP packet. Accordingly, in the transport layer of the system according to the disclosure, the PDU set may avoid the case of having one PDU including two or more slices when transmitting a video frame including one or more slices. Accordingly, the PDU set may allow one or more PDUs for each slice to be mapped to each slice for a video frame that includes one or more slices.

When the application layer transmits a video frame including one or more slices as described above to the transport layer, the application layer may provide PDU set integrity handling information (PSIHI) as one of the additional metadata for the PDU set. In the disclosure, the PDU set integrity handling information is information for determining an extent to which a PDU set may be used in the application layer on the reception end even if it is damaged during transmission.

In an embodiment, the PDU set integrity information may be provided as the ratio or number of I/P/B slices of a plurality of slices constituting the frame. If the ratio or number of sizes of I, P, and B slices is provided, respectively, as an integer expression whose total sum is 100 or 98 or more, the transport layer may allocate more transmission resources (e.g., bandwidth) to the PDU sets with a high I or P ratio to reduce transmission errors, or review and execute retransmission such as ARQ.

In another embodiment, as the PDU set integrity information, the PDU index of the I/P/B slice of the plurality of slices constituting the frame, that is, listSliceInfo, which is PDU sequence numbers, may be provided. When a list of sequence numbers of PDUs corresponding to an I or P slice is transmitted through listSliceInfo, the transport layer identifies whether the corresponding PDUs have been transmitted normally during the transmission process, and if an error occurs in the transmission of the corresponding PDU, the integrity is considered broken. A PDU set PDU error rate (PSPER) field and value may be given as separate information regarding the tolerance level of PDUs requiring integrity among the PDUs with errors within the size of one PDU set. Unlike the conventional packet error rate (PER; allowable error range of a packet) or PDU set error rate (PSER; allowable error range of a PDU set), the PSPER proposed in the disclosure indicates an allowable error range only for the PDUs requiring integrity within a PDU set. Accordingly, in case where one PDU set includes list information of PDUs corresponding to an I/P slice, and PSPER information, and a transmission error occurs for some PDUs, the transport layer according to the disclosure uses the above information whether to determine integrity. For example, if the PDU in which a transmission error has occurred is not included in the PDU list corresponding to the I/P slice, the PDU may be determined to correspond to a B slice and the PDU set may be still determined to have integrity. Even if a PDU with a transmission error is included in the PDU list corresponding to the I/P slice, if the number or size of the PDU with a transmission error does not exceed PSPER relative to the number or size of the list of PDUs, the PDU set may be still determined to have integrity. In other cases, it may be determined that integrity has been lost.

In another embodiment, as the PDU set integrity information, information indicating whether each PDU of a plurality of slices constituting a frame belongs to an I, P, or B slice and PSPER information for each PDU set to which the PDU belongs may be provided. The transport layer gathers the PDUs received from the application layer to form a PDU set, and may determine integrity based on the information on the PDUs as in the above embodiment.

[Embodiment 4] Structure Expression Method of Coding Structure

In the transport system according to the disclosure, the application layer decomposes the user data into fragments of unit that may be transmitted to the transport layer, that is, unit that may be handled by the transport layer, and for each fragment, description information that the transport layer must consider during the transmission process is included. The description information includes the structure of user data and is macroscopic information that cannot be understood or determined from the perspective of the transport layer. For example, when compressing consecutive video frames using a video encoder, the application layer flexibly determines how many pictures to group into one group of picture (GoP), how many frames to generate I-frames, what percentage to configure the ratio of B-frames within GoP, and the like. As it changes dynamically depending on the type or degree of change of the scene, the transport layer may not be able to determine which part of the video data is the currently transmitted data.

As described above, from the perspective of the application layer, some parts of user data are processed such as compression or packetization in relation to other parts of user data, so in case where the transport layer refers to a guide on a method for identifying or handling the application layer data structure, the efficiency of transport layer operation may be expected to increase without individually transmitting the coding structure before transmission or each time the coding structure is changed, or registering the coding structure with the transport layer each time a new codec is developed.

In an embodiment of the disclosure, along with the detailed semantic unit or type of semantic unit to which the lowest-level unit data belongs, it is proposed to provide other units of the same meaning, that is, a relationship between one detailed meaning unit and another detailed meaning unit, and a relationship between one meaning unit and another meaning unit. For example, in the case of video data, a frame may be mapped as a semantic unit, and a slice may be mapped as a detailed semantic unit. Types of frames may include I-frame, P-frame, and B-frame. An I-frame is a frame that may be decoded independently without depending on other frames. I-frames may be further classified into instantaneous decoding refresh (IDR) and clean random access (CRA). In the case of IDR, previous frames do not refer to the IDR frame, while, in the case of CRA, previous transmitted frames may refer to succeeding CRA frames. The P-frame is a frame that is predicted from the I-frame transmitted before or after, and its content may be decoded normally only if the I-frame is present. In addition, the P-frame is classified into unidirectional P-frame, bidirectional P-frame, etc. depending on whether it is predicted from the preceding I-frame or from the succeeding I-frame. The B-frame is a frame predicted from the I frame, P frame, or other B frame. Generally, no other frame refers to the B-frame, but in recent video coding, other frames may refer to the B-frame. The B-frame is classified into unidirectional P-frame, bidirectional P-frame, etc. depending on whether the direction in which other frames refer to the B-frame is from succeeding frames or from preceding frames.

Meanwhile, a frame may include several different slices, and slices are classified into I-slice, P-slice, and B-slice depending on whether they are referenced or not and the type of prediction. The P-frame and B-frame may have I, P, and B slices, respectively, and PI slice (i.e., I-slice of P-frame) and PP slice (P-slice of P-frame) are referenced by the preceding and succeeding bidirectional slices. The PB slice is referenced only by the preceding slice, and the BI, BP slices are referenced by the succeeding slice, and the BB slice is not referenced by any other slices.

The types of frames and slices are numbered one by one for all available types using a datatypeindex field. For example, in the order described above, in case of 0, it may be expressed as an I-CRA frame, in case of 1, it may be expressed as an I-IDR frame; in case of 2, it may be expressed as a bidirectional P-frame; in case of 3, it may be expressed as a unidirectional P-frame; in case of 4, it may be expressed as a B-frame; in case of 5, it may be a bidirectional referenced B-frame; in case of 6, it may be expressed as a unidirectional reference B-frame; in case of 7, it may be expressed as an I-slice of a P-frame; in case of 8, it may be expressed as a P-slice of a P-frame; in case of 9, it may be expressed as a B-slice of a P-frame; in case of 10, it may be expressed as a I-slice of a B-frame; in case of 11, it may be expressed as a P-slice of a B-frame; in case of 12, it may be expressed as a B-slice of a B-frame.

From the types and structural reference relationships of frames and slices as described above, is_frame, which is an identifier indicating that the lowest-unit data transmitted from the application layer to the transport layer is a frame or slice, type_frame and type_slice, which are identifiers indicating whether it is a frame or slice, dir_referenced, which is an identifier that indicates whether it is referenced in the preceding or succeeding direction, or hasnodependency and hasnoreference, which are identifiers that indicate whether it is not referenced at all (e.g., I-IDR frame) or not referenced (B-frame, BB-slice), and the like may be considered, respectively. The user data of the application layer is displayed as description information (e.g., scheme ID or profile ID, etc.) that may determine whether to combine the above identifiers or use identifiers according to the disclosure together with a separate type_data identifier. After determining whether the description information is supported, the transport layer may determine the relationship that the upper or next-level unit data including the received transport packet has with other data of the same meaning from the values of the identifiers.

is_frame has a value of 1 when the user data corresponds to a frame or an Access unit, or may be classified as an independent unit, and has a value of 0 otherwise, for example, in case where it is a slice or an access unit fragment.

type_frame has a value of 0 when is_frame is 1, a value of 0 if the user data is an I-frame, a value of 1 if it is a P-frame, and a value of 2 if it is a B-frame. Likewise, when is_frame is 0, it has a value of 1 if the user data is a slice of a P-frame, and a value of 2 if it is a slice of a B-frame.

type_slice is provided only when is_frame is 0, and has a value of 0 if the user data is an I-slice, a value of 1 if the user data is a P-slice, and a value of 2 if the user data is a B-slice.

dir_referenced indicates whether user data is referenced by preceding or succeeding data. A value of 0 indicates that there is no information referenced in any direction, examples of which may be B-frame or BB-slice. The binary number 10b, that is, the decimal number 2, indicates that there is data referencing the current data among preceding data, that is, data that has already been transmitted, and is semantically equivalent to bPrevHasDep. The binary number 01b, that is, the decimal number 1, indicates that there is data referencing the current data among the succeeding data, that is, data to be transmitted later, and is semantically equivalent to bNextHasDep. The binary number 11b, that is, decimal number 3, indicates the case of referring to the current data in both preceding and succeeding directions. The sizePrevHasDep and sizeNextHasDep fields, which are provided when bPrevHasDep or bNextHasDep is 1, may be provided when dir_referenced is 1, 2, or 3.

If the value of has_no_dependency is 1, it indicates that the current data has no dependency on other data, that is, it does not refer to other data. If the value of has_no_dependency is 1, it indicates that no further data is needed other than the data in the PDU set including the current data when decoding video frames, etc. at a reception terminal that has received the current data.

If the value of has_no_reference is 1, it indicates that there is no other data referencing the current data. Since it is not referenced by other data, it indicates that there will be no problem in decoding other frames even if the current data is not transmitted as a result of determination such as drop. The clean_drop field may be used as another way to express what has_no_reference means. When the value of clean_drop is 1, even if the current data and the PDU set to which the current data belongs are not transmitted, it indicates that there is no problem with the use of other frames or other PDU sets in the application layer. Another way of expressing it is that among the values of importance, when the value with the lowest importance semantically, for example, 0 indicates the highest importance, the value of maximum may be considered that the value of has_no_reference is 1. Conversely, when the value with the highest semantic importance among the importance values indicates 0, if the value of importance is 0, it may be considered that the value of has_no_reference is 1.

In case of requiring transmission resource operation, in case where the transport layer determines that there will be restrictions on the number of retransmissions due to available transmission bandwidth, congestion, packet error, etc., based on the above information, the transport layer may determine whether to transmit current data. As described above, the description information explains the relationship between other transmission data and the current transmission data, and may determine whether there is impact due to drop and the direction of the impact.

[Embodiment 5] when a Slice is a PDU Set

The conventional PDU layer operates the PDU set delay budget (PSDB) to secure the resources necessary for complete transmission of a PDU set that may have one application layer semantic unit. The PSDB means delay time sufficient for at least one PDU set to be transmitted, taking the size of the PDU set as input.

Figure 6:
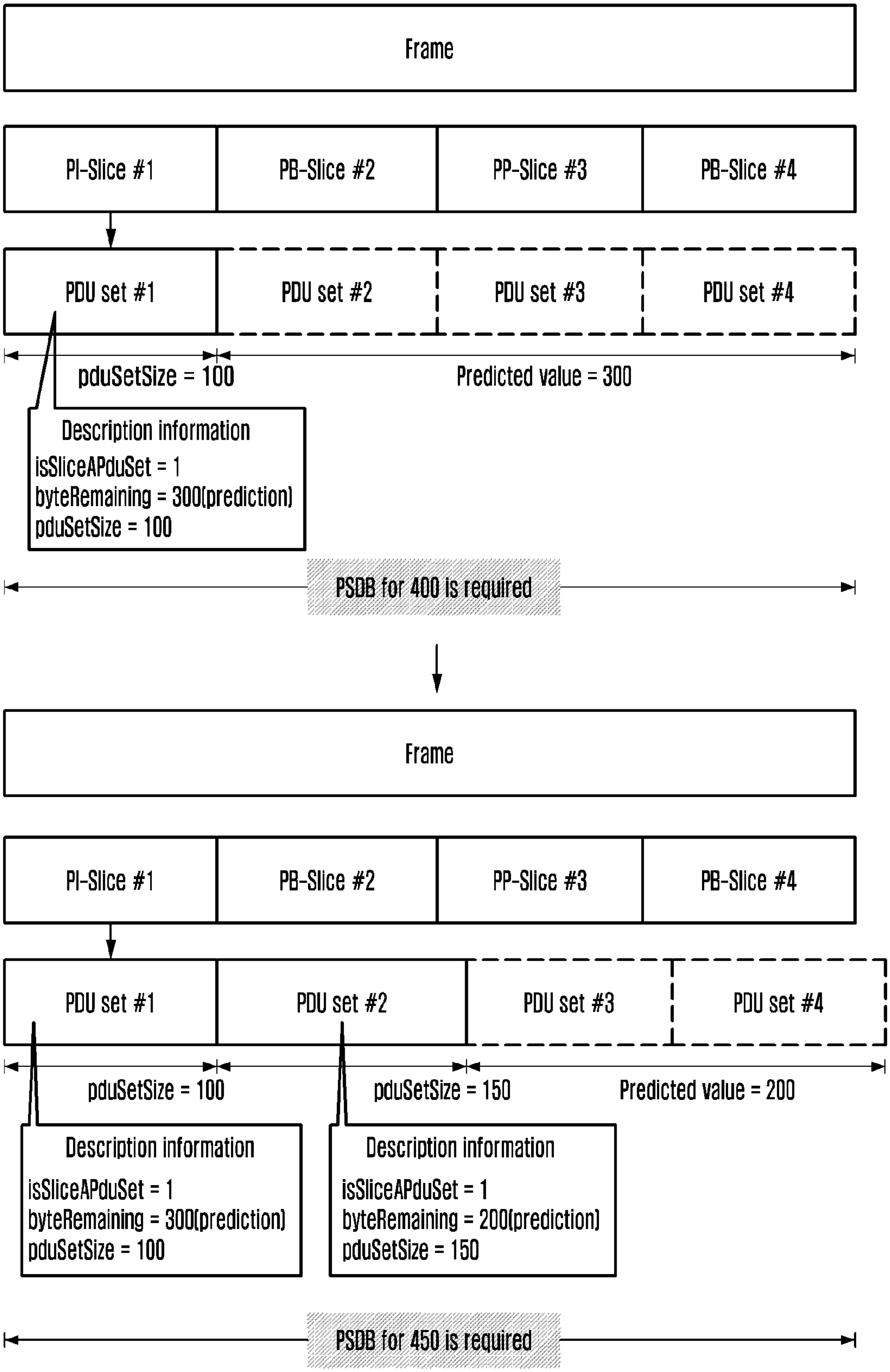
FIG. 6 illustrates a diagram for explaining a frame structure and a PSDB for a PDU set according to an embodiment of the disclosure.

FIG. 6 illustrates a diagram for explaining a frame structure and a PSDB for a PDU set according to an embodiment of the disclosure.

With reference to FIG. 6, in an embodiment of the disclosure, a slice may be mapped to one PDU set. In this case, one complete semantic unit of user data, that is, a frame, cannot be transmitted using only the PSDB for one PDU set. Accordingly, in case where description information is written at the application layer so that a slice is mapped to a PDU set, signaling and additional description information are provided for the written description information.

The isSliceAPduSet field indicates that the PDU set to which the current data belongs corresponds to a detailed semantic unit of the application layer, for example, a slice. In case where the frame corresponds to a PDU set, the value of the isSliceAPduSet field is 0. In case where the value of the isSliceAPduSet field is 1, the byteRemaining field is written. The byteRemaining field describes the size of the PDU set belonging to the current frame among the remaining PDU sets excluding the current PDU set. For example, in one frame including 4 slices, in case where each slice includes a PDU set, the value of isSliceAPduSet is 1 for the PDU set corresponding to the first slice, and the sum of the sizes of the 2nd, 3rd, and 4th PDU sets is written in the byteRemaining. When the PDU layer secures the PSDB, if the value of isSliceAPduSet of the first PDU set is 1, it is necessary to identify the size of the remaining PDU sets required for information transmission in frame units in addition to the pduSetSize, which is the size of the PDU set. In this case, by referring to the byteRemaining, the size of the entire delay budget required even before the 2nd, 3rd, and 4th PDU sets are received.

In the above example, if the 2nd, 3rd, and 4th PDU sets become larger or smaller during the creation process, the 2nd PDU set records the changed pduSetSize and byteRemaining based on the updated information, and the PDU layer determines whether pduSetSize PDUset #1+byteRemaing PDUset #1, which is the calculation formula for the delay budget secured for conventional frame-unit transmission, is smaller than pduSetSize PDUset #1+pduSetSize PDUset #2+byteRemaining PDUset #2, by comparing the two formulas and determine whether additional resources for the transport layer are needed.

Figure 7:
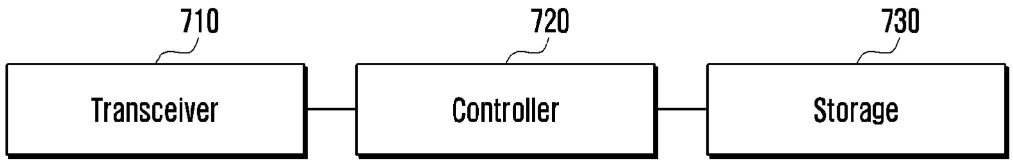
FIG. 7 illustrates a diagram of a structure of a network entity according to an embodiment of the disclosure.

FIG. 7 illustrates a diagram of a structure of a network entity according to an embodiment of the disclosure.

A network entity in FIG. 7 may be implemented with a terminal, base station, UPF, DN, etc.

With reference to FIG. 7, the network entity may include a transceiver 710, a controller 720, and a storage 730. In the disclosure, the controller may be defined as a circuit or application-specific integrated circuit or at least one processor.

The transceiver 710 may transmit and receive signals with other network entities. For example, the transceiver 710 may receive PDU set-related information from another terminal, base station, UPF, or the like.

The controller 720 may control overall operations according to the data transmission method of the embodiment proposed by the disclosure. For example, the controller 720 may configure PDU set-related information according to the method described above.

The storage 730 may store at least one of information transmitted and received through the transceiver 710 and information generated through the controller 720. For example, the storage 730 may store values of the bPrevHasDep, sizePrevHasDep, bNextHasDep, and sizeNextHasDep fields.

The embodiments of the disclosure disclosed in the specification and drawings are merely provided as specific examples to easily explain the technical content of the disclosure and to facilitate understanding of the disclosure, and are not intended to limit the scope of the disclosure. It is obvious to those skilled in the art that in addition to the embodiments disclosed herein, other modifications based on the technical idea of the disclosure can be implemented.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a transport layer of a first network entity in a wireless communication system, the method comprising:

receiving, from an application layer of the first network entity, real time transport protocol (RTP) packets associated with video data and information on importance associated with each packet data unit (PDU) set of PDU sets, wherein the information on importance indicates an error propagation size;

generating the PDU sets based on the received RTP packets;

determining which PDU sets to transmit among the generated PDU sets based on the information on importance; and transmitting, to a second network entity, the determined PDU sets.

2. The method of claim 1, wherein the information on importance of a PDU set is associated with a number of affected frames which precedes or follows the PDU set.

3. The method of claim 1, wherein the information on importance of a PDU set is associated with a size of affected data which precedes or follows the PDU set.

4. The method of claim 1, wherein determining which PDU sets to transmit is performed in case that PDU data is lost or a PDU transmission is delayed or interrupted.

5. The method of claim 1, wherein the information on importance is expressed in information bits.

6. A method performed by an application layer of a first network entity in a wireless communication system, the method comprising:

receiving, from a third network entity, video data;

segmenting the video data into a plurality of semantic units, wherein the plurality of semantic units includes at least one of an I-frame, a B-frame, or a P-frame;

generating information on importance associated with each packet data unit (PDU) set of PDU sets based on a relation between the plurality of semantic units, wherein the information on importance indicates an error propagation size; and transmitting, to a transport layer of the first network entity, real time transport protocol (RTP) packets associated with the video data and the information on importance.

7. The method of claim 6, wherein the information on importance of a PDU set is associated with a number of affected frames which precedes or follows the PDU set.

8. The method of claim 6, wherein the information on importance of a PDU set is associated with a size of affected data which precedes or follows the PDU set.

9. A first network entity in a wireless communication system, the first network entity comprising:

a transceiver;

a controller; and a transport layer configured to:

receive, from an application layer of the first network entity, real time transport protocol (RTP) packets associated with video data and information on importance associated with each packet data unit (PDU) set of PDU sets, wherein the information on importance indicates an error propagation size, generate the PDU sets based on the received RTP packets, determine which PDU sets to transmit among the generated PDU sets based on the information on importance, and transmit, to a second network entity, the determined PDU sets.

10. The first network entity of claim 9, wherein the information on importance of a PDU set is associated with a number of affected frames which precedes or follows the PDU set.

11. The first network entity of claim 9, wherein the information on importance of a PDU set is associated with a size of affected data which precedes or follows the PDU set.

12. The first network entity of claim 9, wherein determining which PDU sets to transmit is performed in case that PDU data is lost or a PDU transmission is delayed or interrupted.

13. The first network entity of claim 9, wherein the information on importance is expressed in information bits.

14. A first network entity in a wireless communication system, the first network entity comprising:

a transceiver;

a controller; and an application layer configured to:

receive, from a third network entity, video data, segment the video data into a plurality of semantic units, wherein the plurality of semantic units includes at least one of an I-frame, a B-frame, or a P-frame, generate information on importance associated with each packet data unit (PDU) set of PDU sets based on a relation between the plurality of semantic units, wherein the information on importance indicates an error propagation size, and transmit, to a transport layer of the first network entity, real time transport protocol (RTP) packets associated with the video data and the information on importance.

15. The first network entity of claim 14, wherein the information on importance of a PDU set is associated with a number of affected frames which precedes or follows the PDU set.

16. The first network entity of claim 14, wherein the information on importance of a PDU set is associated with a size of affected data which precedes or follows the PDU set.

* * * * *